United States Patent
Maeda et al.

(10) Patent No.: US 11,946,580 B2
(45) Date of Patent: Apr. 2, 2024

(54) JOINED BODY AND METHOD FOR PRODUCING SAME

(71) Applicant: KOBE STEEL, LTD., Hyogo (JP)

(72) Inventors: Yasuhiro Maeda, Kobe (JP); Toru Hashimura, Kobe (JP); Taiki Yamakawa, Kobe (JP)

(73) Assignee: KOBE STEEL, LTD., Hyogo (JP)

(*) Notice: Subject to any disclaimer, the term of this patent is extended or adjusted under 35 U.S.C. 154(b) by 110 days.

(21) Appl. No.: 17/597,696

(22) PCT Filed: Jul. 16, 2020

(86) PCT No.: PCT/JP2020/027648
§ 371 (c)(1),
(2) Date: Jan. 18, 2022

(87) PCT Pub. No.: WO2021/024740
PCT Pub. Date: Feb. 11, 2021

(65) Prior Publication Data
US 2022/0275896 A1    Sep. 1, 2022

(30) Foreign Application Priority Data
Aug. 8, 2019  (JP) ................. 2019-146676

(51) Int. Cl.
*F16L 41/08* (2006.01)
*B21D 39/06* (2006.01)
(Continued)

(52) U.S. Cl.
CPC ............ *F16L 41/08* (2013.01); *B21D 39/06* (2013.01); *B21D 39/206* (2013.01); *B21D 53/88* (2013.01); *F16B 17/006* (2013.01)

(58) Field of Classification Search
CPC ....... F16L 41/08; F16B 11/006; F16B 17/006; B21D 53/88; B21D 39/206; B21D 39/06
See application file for complete search history.

(56) References Cited

U.S. PATENT DOCUMENTS 4,576,247 A * 3/1986 Thorpe .................. B21D 39/06
181/243
4,706,999 A * 11/1987 Hynes ................... F16L 41/088
16/2.2
(Continued)

FOREIGN PATENT DOCUMENTS

EP          3254781 A1    12/2017
JP          S51-133170 A  11/1976
(Continued)

OTHER PUBLICATIONS

International Search Report issued in PCT/JP2020/027648; dated Aug. 25, 2020.
(Continued)

*Primary Examiner* — James M Hewitt, II
(74) *Attorney, Agent, or Firm* — Studebaker & Brackett PC

(57) ABSTRACT

A joined body includes a tubular first member, and a second member including a plate-shaped wall portion in which a through-hole is formed, the first member being inserted into the through-hole. The collar member is interposed between the first member and the second member in at least a part of the hole peripheral wall of the through-hole. The first member and the second member are joined by expanding the first member at a portion corresponding to the through-hole.

11 Claims, 11 Drawing Sheets

(51) Int. Cl.
  *B21D 39/20* (2006.01)
  *B21D 53/88* (2006.01)
  *F16B 17/00* (2006.01)

(56) References Cited

U.S. PATENT DOCUMENTS

| | | | | |
|---|---|---|---|---|
| 5,863,081 | A * | 1/1999 | Katayama | B21D 39/06 |
| | | | | 29/512 |
| 8,266,782 | B2 * | 9/2012 | Miyazaki | F16B 17/006 |
| | | | | 29/523 |
| 2002/0053536 | A1 * | 5/2002 | Mannes | B04C 5/28 |
| | | | | 209/729 |
| 2003/0234540 | A1 * | 12/2003 | Igami | F28F 9/0248 |
| | | | | 285/374 |
| 2009/0058081 | A1 * | 3/2009 | Martin | F16L 41/088 |
| | | | | 285/196 |
| 2010/0289300 | A1 * | 11/2010 | Kokubo | B62D 21/02 |
| | | | | 403/204 |
| 2018/0015527 | A1 * | 1/2018 | Maeda | B21D 39/06 |
| 2018/0272478 | A1 * | 9/2018 | Maeda | B21D 39/04 |
| 2020/0246860 | A1 | 8/2020 | Maeda et al. | |

FOREIGN PATENT DOCUMENTS

| | | |
|---|---|---|
| JP | S52-109729 A | 9/1977 |
| JP | H09-192760 A | 7/1997 |
| JP | 2010-046697 A | 3/2010 |
| JP | 6454233 B2 | 1/2019 |
| JP | 6465233 B2 | 2/2019 |
| WO | 2018/180488 A1 | 10/2018 |

OTHER PUBLICATIONS

The extended European search report issued by the European Patent Office dated Jul. 18, 2022, which corresponds to European Application No. 20851068.5-1103 and is related to U.S. Appl. No. 17/597,696.

International Preliminary Report On Patentability and Written Opinion issued in PCT/JP2020/027648; dated Feb. 17, 2022.

* cited by examiner

JOINED BODY AND METHOD FOR PRODUCING SAME

CROSS-REFERENCE TO RELATED APPLICATIONS

This is a national phase application in the United States of International Patent Application No. PCT/JP2020/027648 with an international filing date of Jul. 16, 2020, which claims priority of Japanese Patent Application No. 2019-146676 filed on Aug. 8, 2019 the contents of which are incorporated herein by reference.

TECHNICAL FIELD

The present invention relates to a joined body and a method for producing the same.

BACKGROUND ART

In order to reduce a weight and improve safety of automobiles, a metal with low specific density and high strength called high tensile steel is used. The high tensile steel is effective in reducing weight and improving safety, but it is heavier than low density materials such as aluminum. Further, when the high tensile steel is used, problems such as a decrease in formability, an increase in a forming load, and a decrease in dimensional accuracy occur due to the high strength. In order to solve these problems, in recent years, multi-materialization has been carried out in which extruded products, cast products, and press-formed products using aluminum or an aluminum alloy having a lower specific density than steel are utilized in combination with steel parts.

The problem with multi-materialization is joining of dissimilar metals such as steel parts and aluminum parts. In general, it is difficult to join the dissimilar metals having different properties in this way, but for example, JP 51-133170 A, JP H9-192760 A, and JP 6465233 B2 disclose a method for joining members, that enables joining of the dissimilar metals in multi-materialization by using an elastic body. Specifically, in the method for joining members of JP 51-133170 A, JP H9-192760 A, and JP 6465233 B2, a tube body is inserted into a through-hole of a wall portion (plate member), an elastic body (urethane rubber member) is inserted inside the tube body (tube member), and the elastic body is deformed by applying pressure, thereby expanding the tube body and caulking and joining the wall portion and the tube body.

PRIOR ART DOCUMENT

Patent Document

Patent Document 1: JP 51-133170 A
Patent Document 2: JP H9-192760 A
Patent Document 3: JP 6454233 B2

SUMMARY OF THE INVENTION

In the joining method of JP 51-133170 A, JP H9-192760 A, and JP 6465233 B2, a hole peripheral wall of a through-hole of a wall surface body is in contact with the expanded tube body. Therefore, an area of the hole peripheral wall determined by a peripheral length of the hole peripheral wall and a thickness of the wall portion is a joint area between the wall portion and the tube body. Since the thickness of the wall portion cannot be set excessively large, it is difficult to secure a sufficiently large joint area. If the joint area cannot be made sufficiently large, it is difficult to secure joint strength between the wall portion and the tube body and joint durability between the wall portion and the tube body.

Further, the fact that the joint area cannot be sufficiently increased causes piercing or biting of the hole peripheral wall portion of the wall portion into the tube body.

Depending on a shape of the through-hole, the degree of expansion of the tube body due to tube expansion may not be uniform. For example, when the shape of the through-hole is rectangular or similar, the expansion of the tube body is remarkable due to tube expansion, in a portion corresponding to a long side of the through-hole. If the joint area cannot be made sufficiently large, strain increases in a portion of the tube body where the expansion due to tube expansion is remarkable, and the tube body may be cracked in this portion.

An object of the present invention is, in a joined body including a tubular first member and a second member having a plate-shaped wall portion, to increase a joint area between the first member and a wall portion of the second member, thereby improving the joint strength and the joint durability, preventing or suppressing biting of the wall portion of the second member into the first member, and preventing or suppressing cracking of the first member.

A first aspect of the present invention provides a joined body including: a tubular first member; a second member including a plate-shaped wall portion in which a through-hole is formed, the first member being inserted into the through-hole; and a collar member interposed between the first member and the second member in at least a part of a hole peripheral wall of the through-hole, in which the first member and the second member are joined by expanding the first member at a portion corresponding the through-hole.

Specifically, the wall portion includes a first main surface and a second main surface facing each other in a thickness direction of the wall portion, and the collar member includes: a first base portion disposed on the first main surface; and a tubular portion connected to the first base portion, extending in the thickness direction to penetrate the through-hole, including a first end portion located at a distance from the second main surface in the thickness direction, and having an inner peripheral surface in contact with the first member and an outer peripheral surface in contact with the hole peripheral wall of the through-hole.

Since the collar member having the tubular portion is interposed between the first member and the wall portion of the second member, the joint area between the first member and the wall portion of the second member can be increased. As a result, the joint strength and the joint durability between the first member and the second member can be improved. Further, by increasing the joint area, it is possible to prevent or suppress the biting of the wall portion of the second member into the first member. By interposing the collar member having the tubular portion between the first member and the second member, it is possible to prevent or suppress the cracking of the first member by reducing strain due to expansion during caulking joining.

The collar member may further include a second base portion connected to the tubular portion and disposed on the second main surface, and the wall portion may be interposed between the first base portion and the second base portion.

With this configuration, the collar member can be reliably held against the second member when the first member and the second member are caulked and joined.

The tubular portion may further include a second end portion located at a distance from the first main surface in the thickness direction.

The first member may be made of a first metal material, and the second member may be made of a second metal material different from the first metal material. For example, the first metal material may be aluminum or an aluminum alloy, and the second metal material may be high tensile steel. The collar member may be made of the first metal material. In these cases, an adhesive layer interposed between the collar member and the wall portion may be further provided.

By providing the adhesive layer, it is possible to prevent electrolytic corrosion from occurring between the collar member made of the first metal material and the second member made of the second metal material.

The collar member may be made of a resin material.

By interposing the collar member made of the resin material, it is possible to prevent the electrolytic corrosion from occurring between the first member made of the first metal material and the second member made of the second metal material.

The collar member may be annular or non-annular.

A second aspect of the present invention provides a method for producing a joined body, including the following steps of: preparing a tubular first member, a second member including a plate-shaped wall portion in which a through-hole is formed, and a collar member; inserting the first member into the through-hole so that the collar member is interposed between the first member and the second member on a hole peripheral wall of the through-hole; and expanding the first member toward the second member in a portion corresponding to the through-hole, thereby caulking and joining the first member and the second member.

According to the present invention, it is possible to increase a joint area between the first member and a wall portion of the second member, thereby improving the joint strength and the joint durability, preventing or suppressing biting of the wall portion of the second member into the first member, and preventing or suppressing cracking of the first member.

DESCRIPTION OF EMBODIMENTS

Hereinafter, embodiments of the present invention will be described with reference to the accompanying drawings.

First Embodiment

Figure 1:
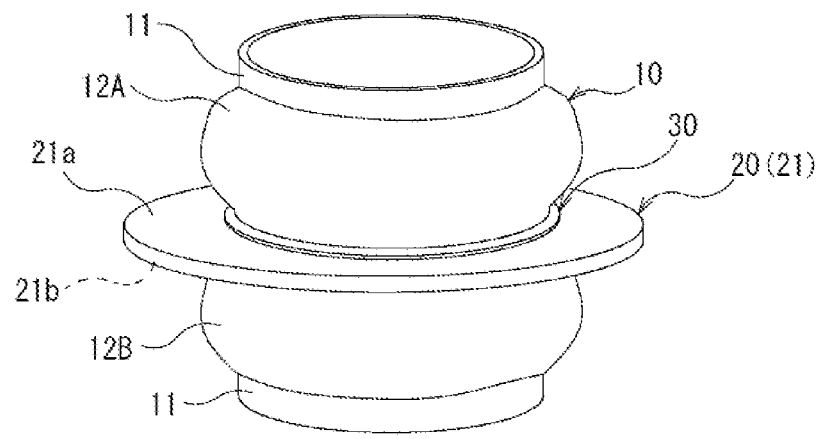
FIG. 1 is a perspective view of a joined body according to a first embodiment of the present invention.
Figure 2:
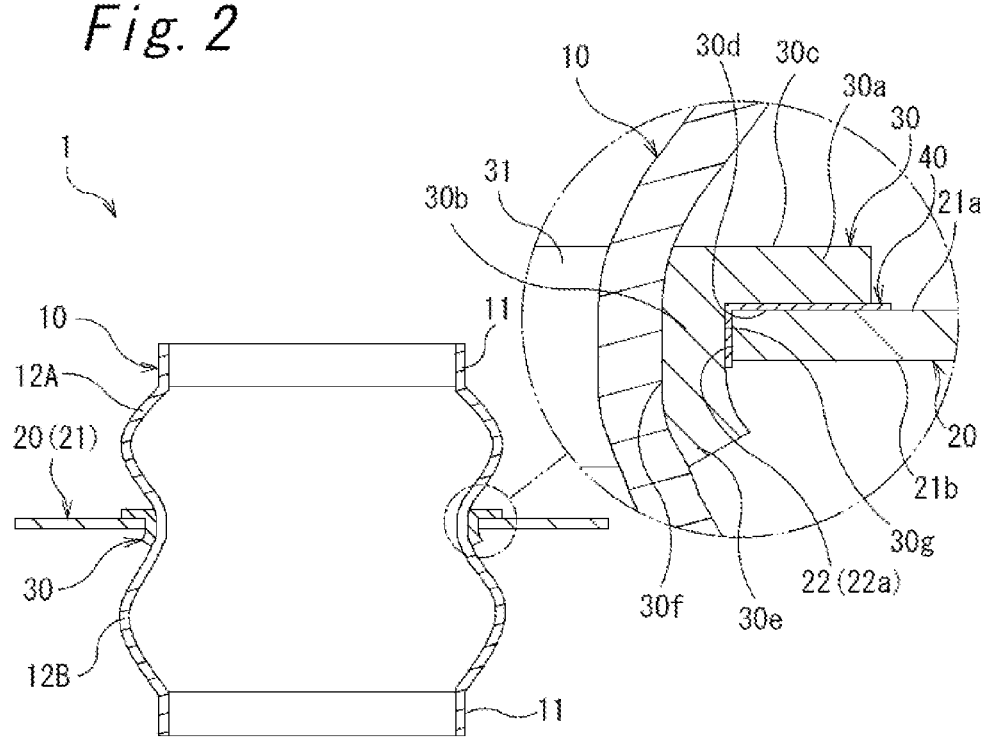
FIG. 2 is a vertical cross-sectional view of the joined body according to the first embodiment.

Referring to FIGS. 1 and 2, a joined body 1 of the present embodiment includes a first member 10, a second member 20, a collar member 30, and an adhesive layer 40. The joined body 1 is configured by caulking and joining the first member 10 and the second member 20 with the collar member 30 interposed therebetween. Further, the adhesive layer 40 is interposed between the collar member 30 and the second member 20.

The first member 10 of the present embodiment is a circular tubular member having both ends open, and is made of aluminum or an aluminum alloy. The first member 10 includes a circular tubular main body 11 and bulging portions 12A and 12B extending in a circumferential direction of the main body 11 and bulging outward in a radial direction of the main body 11. The bulging portions 12A and 12B are arranged on both sides (upper and lower sides in FIGS. 1 and 2) in an axial direction of the main body 11 with respect to the second member 20.

Figure 3:
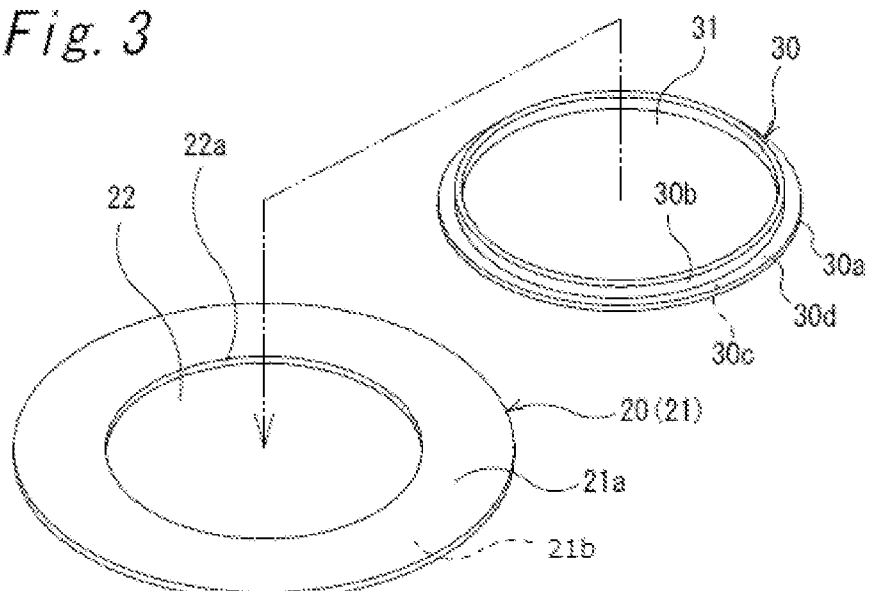
FIG. 3 is a perspective view for explaining mounting of a collar member on a second member (wall portion)

Referring to FIG. 3 together, the second member 20 of the present embodiment includes only the plate-shaped wall portion 21 having an annular shape as a whole. The wall portion 21 which is the second member 20 includes a pair of main surfaces 21a and 21b (first main surface and second main surface) facing each other in a thickness direction of the wall portion 21. In the present embodiment, both the main surfaces 21a and 21b are flat surfaces. As long as joint strength between the first member 10 and the second member 20 can be ensured, one or both of the main surfaces 21a and 21b may be curved surfaces. The wall portion 21, which is the second member 20, is formed with a through-hole 22 that penetrates the wall portion 21 in the thickness direction. In the present embodiment, the through-hole 22 is a circular hole corresponding to that the first member 10 is circular tubular as described above.

Referring to FIG. 3 together, the collar member 30 of the present embodiment is a torus having an integral structure having a narrow width and a thin thickness, and is made of the same material (aluminum or aluminum alloy) as the first member 10. In a region surrounded by the collar member 30, a through-hole 31 that penetrates the collar member 30 in the thickness direction is defined. The collar member 30 includes a base portion 30a (first base portion) and a tubular portion 30b.

The base portion 30a of the present embodiment is flat annular and includes a pair of main surfaces 30c and 30d facing each other in the thickness direction of the base portion 30a. In the present embodiment, the main surfaces 30c and 30d are both flat surfaces. Depending on the shape of the main surfaces 21a and 21b of the wall portion 21 (second member 20), one or both of the main surfaces 30c and 30d of the base portion 30a may be curved surfaces. The base portion 30a is located on the main surface 21a of the wall portion 21. Specifically, a main surface 30d of the base portion 30a is in contact with the main surface 20a of the wall portion 21 via the adhesive layer 40.

The tubular portion 30b of the present embodiment is an opening at both ends, and as illustrated most clearly in FIG. 2, is connected to an end portion on the inner peripheral side (through-hole 31 side) of the base portion 30a. The tubular portion 30b in the present embodiment extends from one side (the main surface 30d side) of the base portion 30a in the thickness direction of the wall portion 21 which is the second member 20, and penetrates the through-hole 22. Therefore, the tubular portion 30b includes an end portion 30e (a first end portion) located at a distance from the main surface 21b in the thickness direction of the wall portion 21. A diameter of the tubular portion 30b is larger on the end portion 30e side than a portion connected to the base portion 30a due to deformation during caulking joining using a rubber member 50 to be described below. An inner peripheral surface 30f of the tubular portion 30b is in direct contact with the first member 10. Further, an outer peripheral surface 30g of the tubular portion 30b is in contact with a hole peripheral wall 22a of the through-hole 22 formed in the wall portion 21 which is the second member 20 via the adhesive layer 40.

Hereinafter, a method for manufacturing the joined body 1 according to the present embodiment will be described.

First, as illustrated in FIG. 3, the collar member 30 is attached to the wall portion 21 which is the second member 20. Specifically, the tubular portion 30b of the collar member 30 is inserted into the through-hole 22 of the wall portion 21, and the base portion 30a of the collar member 30 is disposed on the main surface 21a of the wall portion 21. Before mounting the collar member 30 on the wall portion 21 in this way, a non-conductive adhesive that becomes an adhesive layer 40 when cured is applied to a periphery of the through-hole 22 of the main surface 21a of the wall portion 21, and the hole peripheral wall 22a of the through-hole 22. A part or all of the adhesive may be applied to the main surface 30d of the base portion 30a of the collar member 30 and the outer peripheral surface 30g of the tubular portion 30b.

Figure 4:
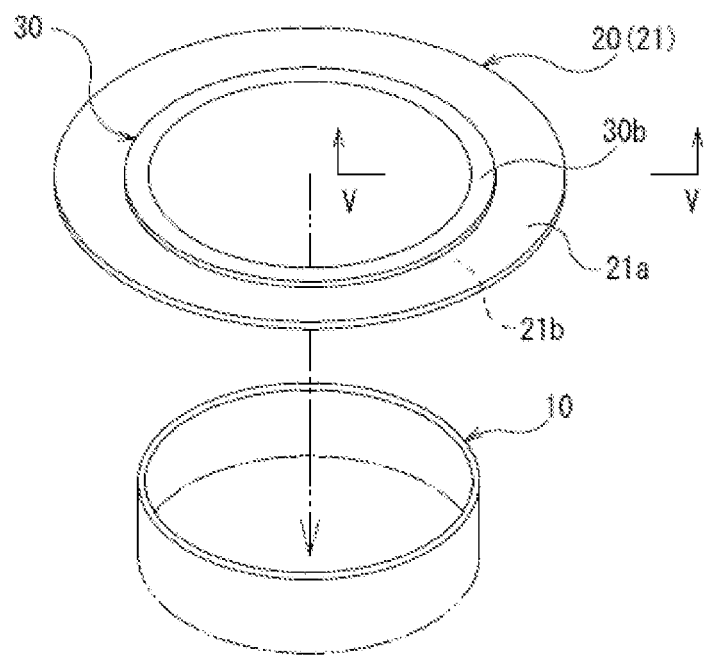
FIG. 4 is a perspective view for explaining insertion of the first member into the mounted first second member.
Figure 5:
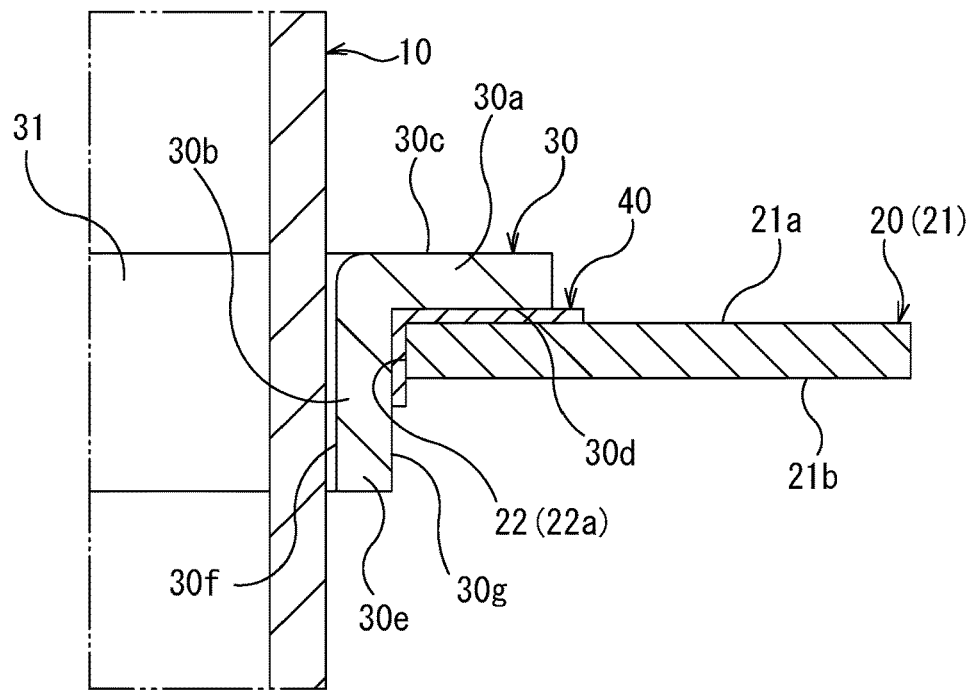
FIG. 5 is a partial cross-sectional view taken along a line V-V of FIG. 4.

Next, as illustrated in FIGS. 4 and 5, the first member 10 is inserted into the through-hole 22 of the wall portion 21 which is the second member 20. More specifically, the first member 10 is inserted into the through-hole 31 defined by the collar member 30 attached to a portion of the through-hole 22 of the wall portion 21.

Figure 6:
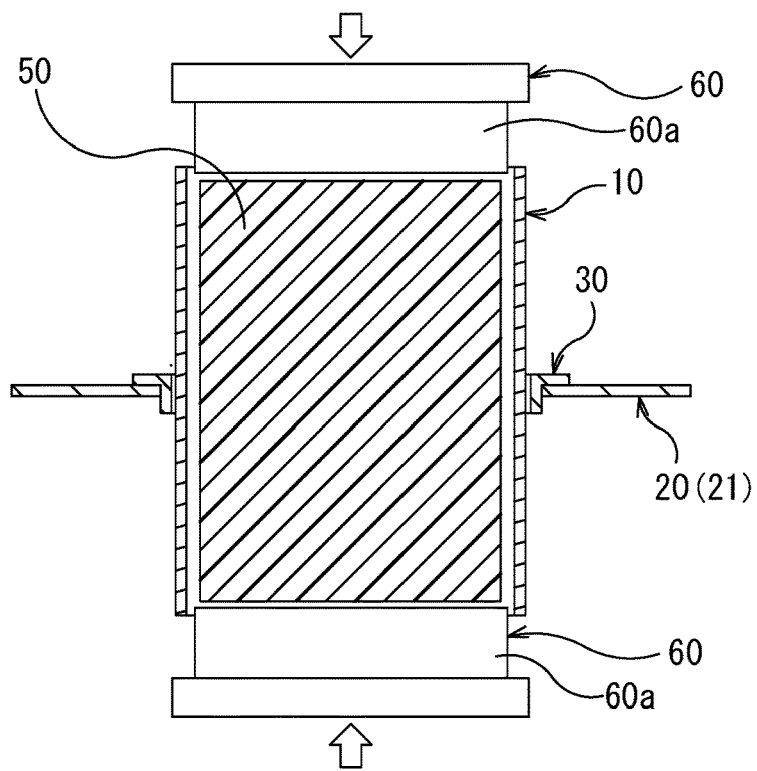
FIG. 6 is a vertical cross-sectional view in a state where a rubber member is inserted in the first member.

In this state, as illustrated in FIG. 6, the rubber member 50 is inserted into the first member 10. In the present embodiment, the rubber member 50 is columnar and has dimensions that can be inserted into the first member 10. An outer shape of the rubber member 50 is similar to an inner shape of the first member 10 in a cross-section perpendicular to the axial direction of the first member 10, and is preferably as large as possible to be inserted. The rubber member 50 has flat surfaces perpendicular to the axial direction of the first member 10 at both ends in a longitudinal direction of the rubber member 50. A material of the rubber member 50 is preferably, for example, either urethane rubber, chloroprene rubber, CNR rubber (chloroprene rubber and nitrile rubber), or silicone rubber. Further, hardness of the rubber member 50 is preferably 30 or more on the shore A scale.

The rubber member 50 may be disposed in the first member 10 before the first member 10 is inserted into the through-hole 22 of the wall portion 21 which is the second member 20.

Subsequently, pushers 60 are arranged at both ends of the rubber member 50. Each pusher 60 includes a pressing portion 60a that presses the rubber member 50. The pressing portion 60a has a columnar shape, and the pressing portion 60a has a pressing surface which is a flat pressing surface at an end portion thereof. The pusher 60 is attached to a press device or the like (not illustrated), and is driven by the press device to compress the rubber member 50 in the axial direction of the first member 10 (see arrows in FIG. 6). With this compression, the rubber member 50 expands radially outward of the first member 10. Due to expansion of the rubber member 50, the first member 10 is expanded, and the first member 10 and the wall portion 21, which is the second member 20, are caulked and joined. At this time, the bulging portions 12A and 12B are formed on both sides in the axial direction of the first member 10 with respect to the wall portion 21. As the bulging portion 12B is formed on the first member 10, the diameter of the end portion 30e side of the tubular portion 30 of the collar member 30 is expanded.

After caulking and joining the first member 10 and the wall portion 21 which is the second member 20, a press device (not illustrated) is driven to release the compression of the rubber member 50 by the pusher 60. Since the rubber member 50 from which a compressive force of the pusher 60 has been removed is restored to its original shape by elasticity of the rubber member 50 itself, it can be easily removed from the first member 10.

As is most clearly illustrated in FIG. 5, in a stage before caulking joining using the rubber member 50, the tubular portion 30b of the collar member 30 has not been expanded in diameter on the end portion 30e side, and has a cylindrical shape with a substantially constant diameter as a whole. Further, the inner peripheral surface 30f of the tubular portion 30b and the main surface 30c of the base portion 30a are connected substantially perpendicular to each other.

The collar member 30 having the tubular portion 30b is interposed between the first member 10 and the wall portion 21 which is the second member 20. The inner peripheral surface 30f of the tubular portion 30b that comes into contact with the first member 10 has a larger area than the hole peripheral wall 22a of the through-hole 22 provided in the wall portion 21. Therefore, by interposing the collar member 30 between the first member 10 and the wall portion 21, a joint area between the first member 10 and the wall portion 21 (second member 20) can be increased. As a result, the joint strength and joint durability of the first member 10 and the second member 20 can be improved. Further, by increasing the joint area, it is possible to prevent or suppress biting of the wall portion 21, which is the second member 20, into the first member 10. By interposing the collar member having the tubular portion 30b between the first member 10 and the wall portion 21 (second member 20), strain of the first member due to expansion during caulking joining is reduced, so that it is possible to prevent or suppress cracking of the first member 10.

FIGS. 7 to 14 illustrate modifications of the first embodiment. The modifications can also be applied to a second embodiment to be described below.

Figure 7:
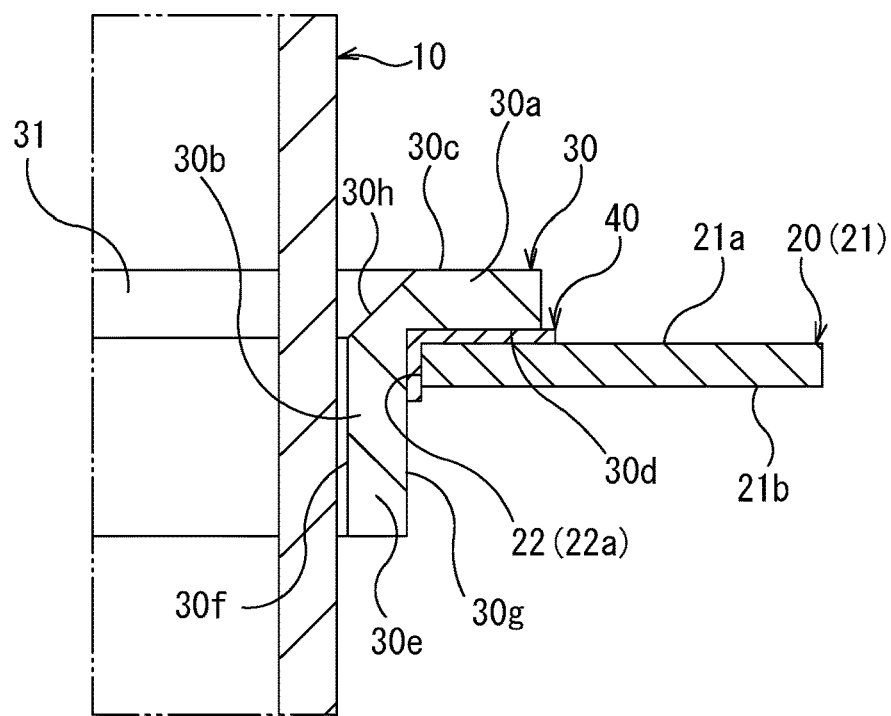
FIG. 7 is a partial cross-sectional view similar to FIG. 5 of a first alternative of the collar member.
Figure 8:
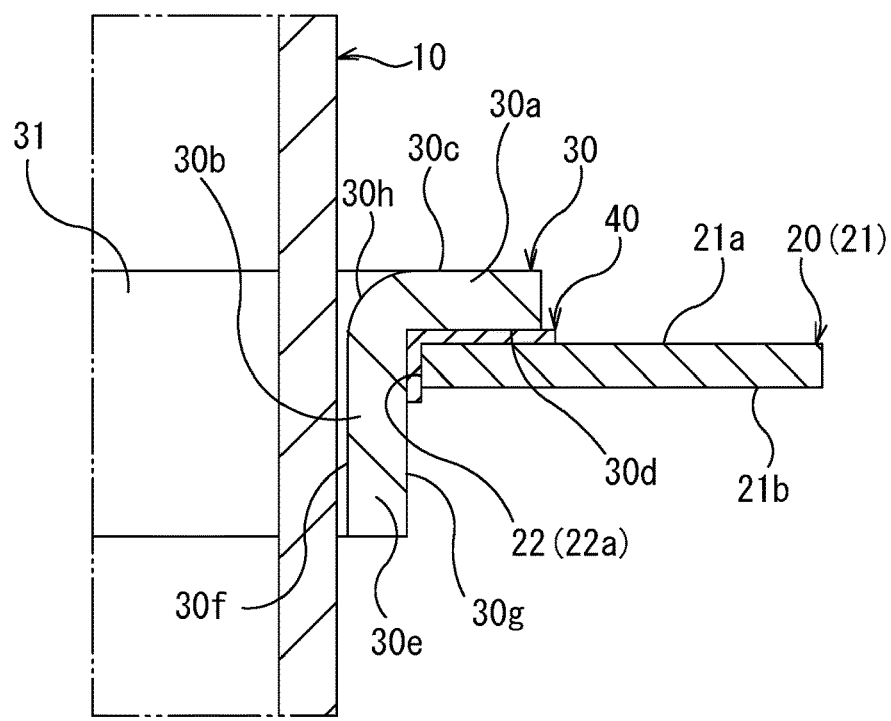
FIG. 8 is a partial cross-sectional view similar to FIG. 5 of a second alternative of the collar member.

In the modifications of FIGS. 7 and 8, a chamfered portion 30h is provided at a portion where the inner peripheral surface 30f of the tubular portion 30b and the main surface 30c of the base portion 30a are connected. The chamfered portion 30h in FIG. 7 is a flat surface, and the chamfered portion 30h in FIG. 8 is a convex curved surface.

The collar member 30 of the modifications of FIGS. 9 to 12 further includes a base portion 30i (second base portion) that is connected to the tubular portion 30b and in contact with the main surface 21b of the wall portion 21 which is the second member 20 via the adhesive layer 40. The base portion 30i includes a pair of main surfaces 30j and 30k facing each other in the thickness direction of the base portion 30i. The wall portion 21 is sandwiched between the main surface 30d of the base portion 30a and the main surface 30j of the base portion 30i via the adhesive layer 40. In this way, the wall portion 21 (second member 20) is sandwiched between the pair of base portions 30a and 30i, so that the collar member 30 can be reliably held against the wall portion 21 when the first member 10 and the second member 20 are caulked and joined.

Figure 9:
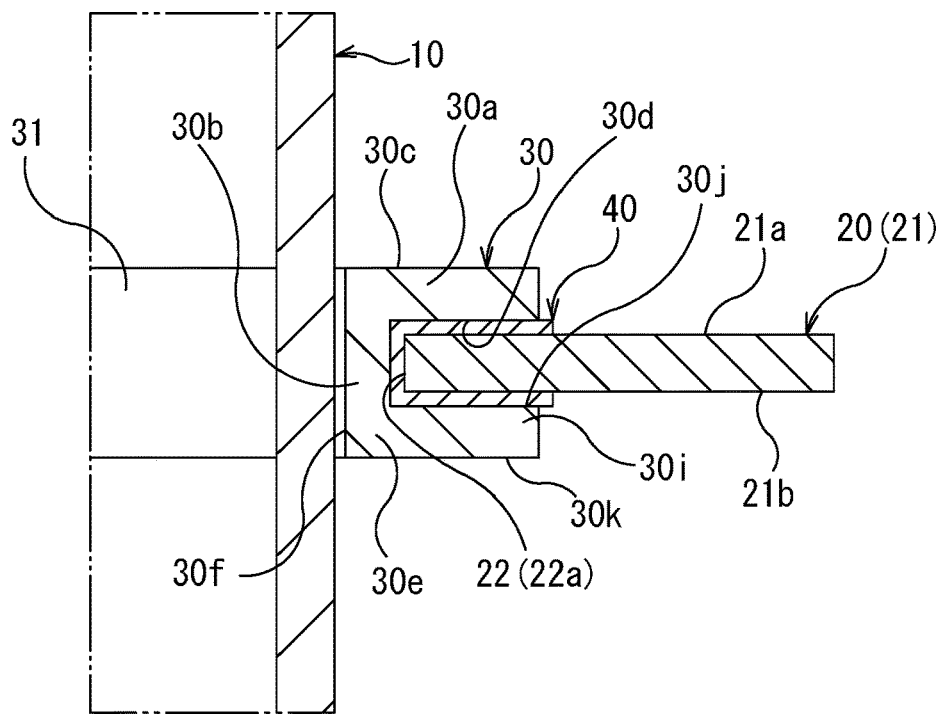
FIG. 9 is a partial cross-sectional view similar to FIG. 5 of a third alternative of the collar member.
Figure 10:
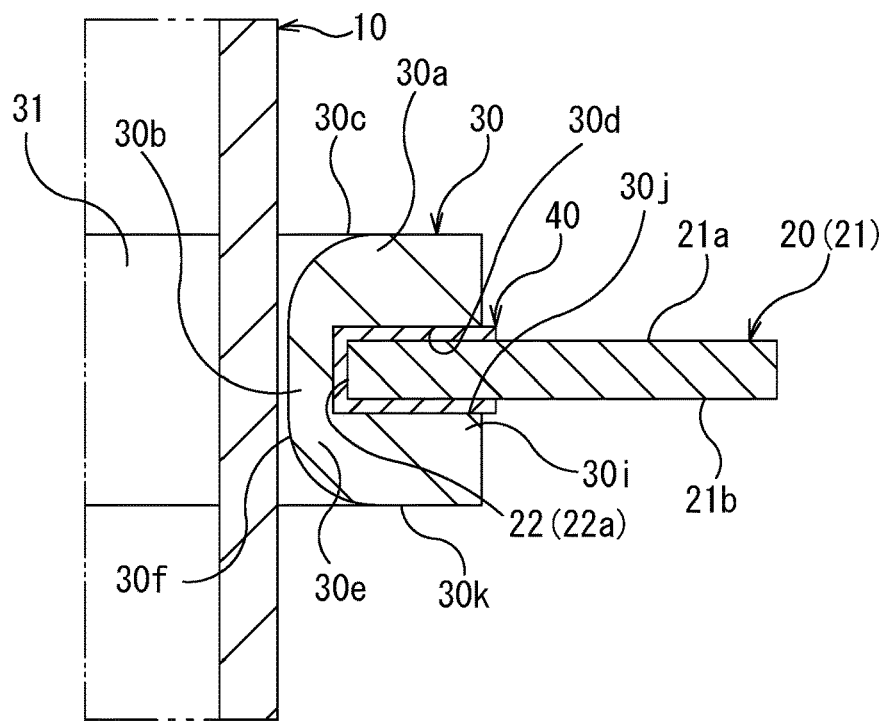
FIG. 10 is a partial cross-sectional view similar to FIG. 5 of a fourth alternative of the collar member.

In the modifications of FIGS. 9 and 10, the end portion 30e of the tubular portion 30b does not protrude beyond the base portion 30i. In the modification of FIG. 9, the inner peripheral surface 30f of the tubular portion 30b is a cylindrical surface having a substantially constant diameter. In the modification of FIG. 10, the inner peripheral surface 30f of the tubular portion 30b is a cylindrical surface having a diameter expanded at both ends in a curved shape.

Figure 11:
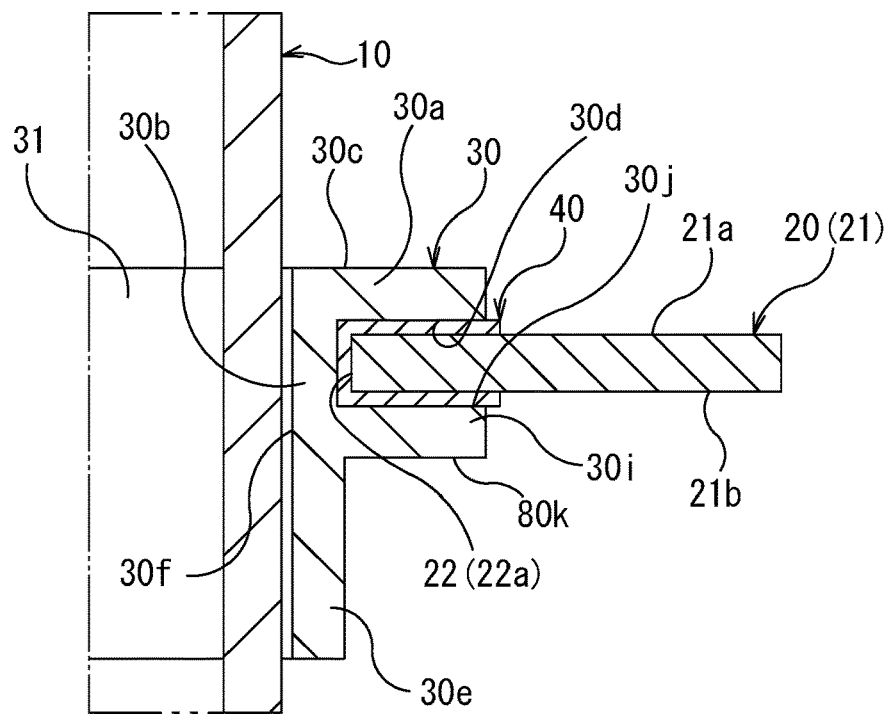
FIG. 11 is a partial cross-sectional view similar to FIG. 5 of a fifth alternative of the collar member.
Figure 12:
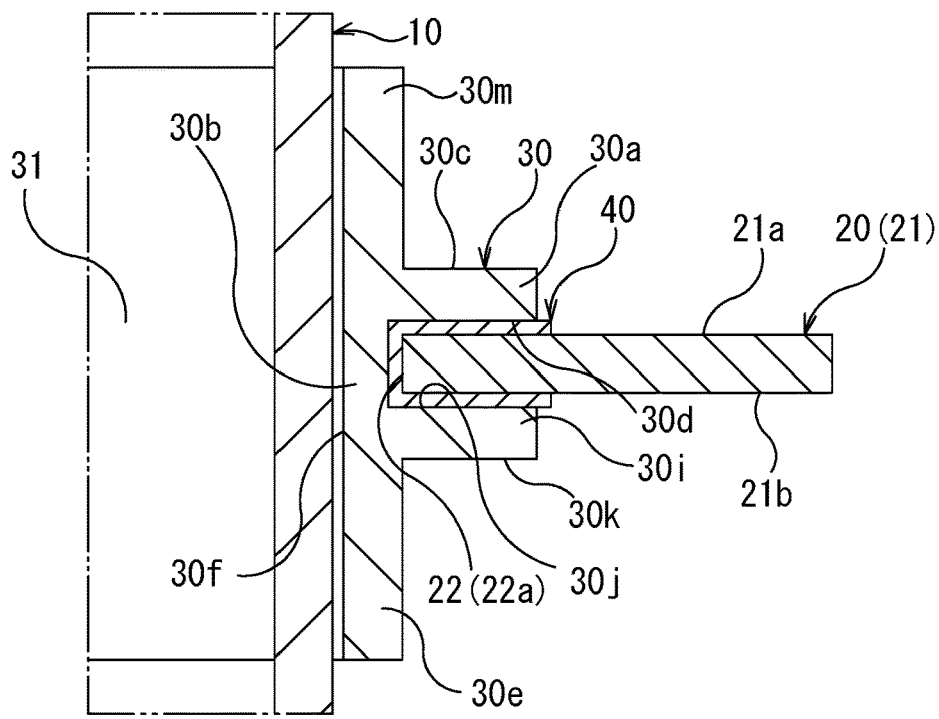
FIG. 12 is a partial cross-sectional view similar to FIG. 5 of a sixth alternative of the collar member.

In the modifications of FIGS. 11 and 12, the end portion 30e of the tubular portion 30b protrudes from the base portion 30i. Further, in addition to the end portion 30e protruding from the base portion 30i, the tubular portion 30b of the collar member 30 of the modification of FIG. 12 includes an end portion 30m (a second end portion) that protrudes from the main surface 30c of the base portion 30i and is located at a distance from the main surface 21a in the thickness direction of the wall portion 21 (second member 20). By having the end portions 30e and 30m respectively protruding from the base portions 30i and 30a, the area of the inner peripheral surface 30f of the tubular portion 30b can be further increased, and the joint area can be further increased.

In the method for manufacturing the joined body 1 of the first embodiment described above, the collar member 30 is fixed to the through-hole 22 of the wall portion 21 which is the second member 20 with the adhesive layer 40, and then the first member 10 is inserted into the through-hole 22. However, in the case of the collar member 30 of the first embodiment, the collar member 30 of the modification of FIG. 7, and the collar member 30 of the modification of FIG. 8, the collar member 30 may be fixed to the first member 10 by means such as adhesion, and then the first member 10 may be inserted into the through-hole 22 of the wall portion 21 which is the second member 20.

Figure 13:
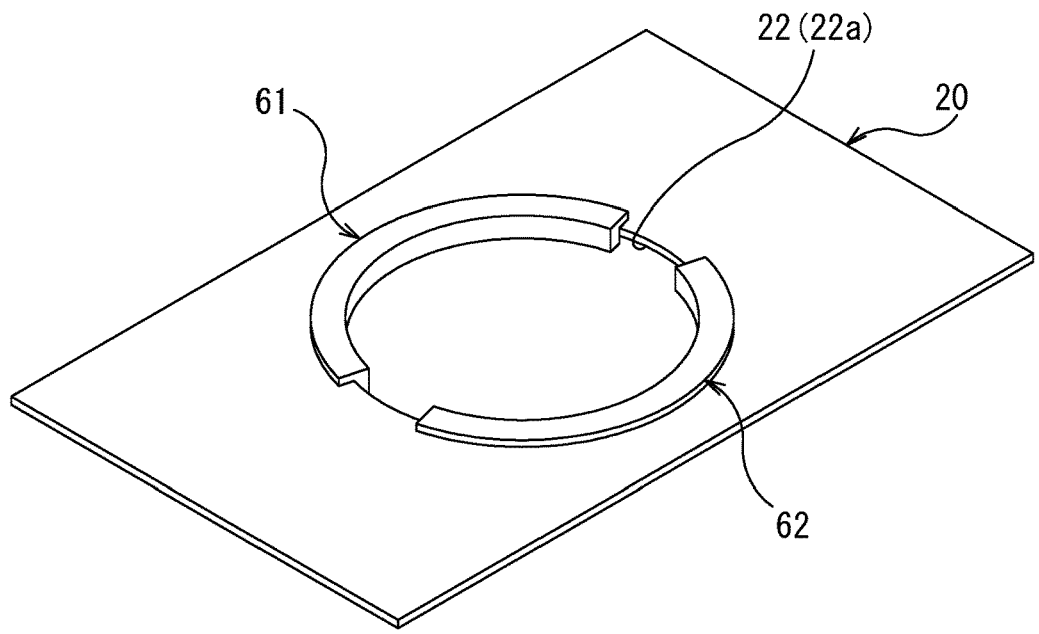
FIG. 13 is a perspective view of a seventh alternative of the collar member.
Figure 14:
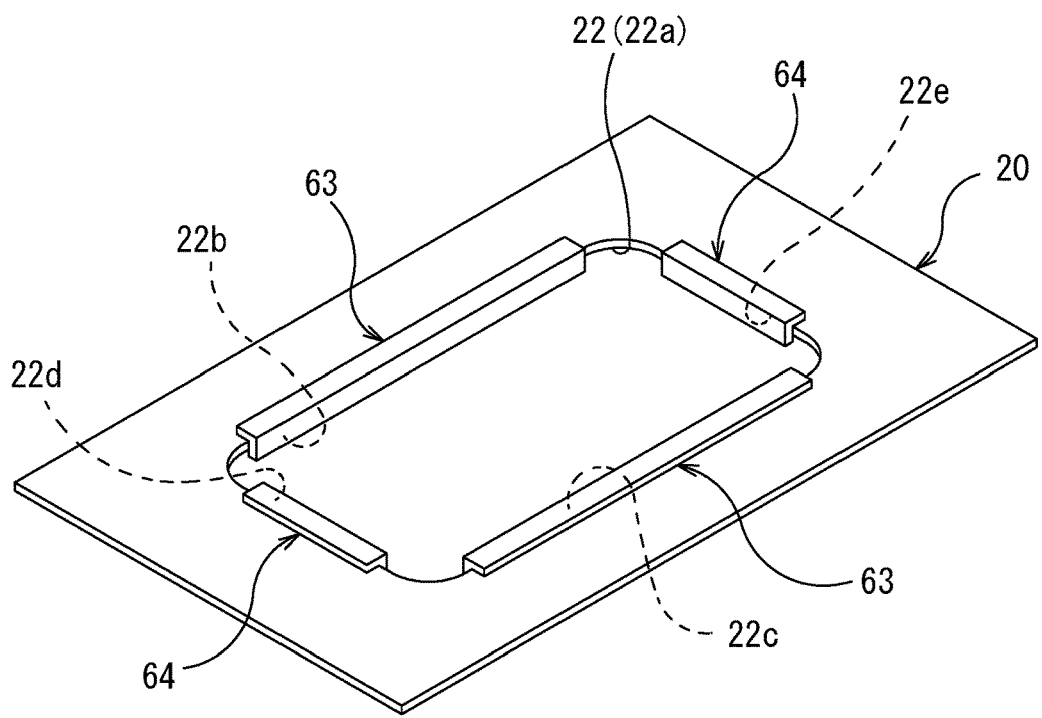
FIG. 14 is a perspective view of an eighth alternative of the collar member.

In the modifications of FIGS. 13 and 14, a split-type non-annular collar member is employed instead of the annular collar member 30 as in the first embodiment.

In the modification of FIG. 13, the through-hole 22 of the second member 20 is a circular hole similar to that of the first embodiment, and two semicircular collar members 61 and 62 are mounted on the through-hole 22.

The through-hole 22 in the modification of FIG. 14 is a rectangle having arcuate four corners. The hole peripheral wall 22a of the through-hole 22 includes two pairs of linear portions, that is, a pair of long side portions 22b and 22c and a pair of short side portions 22d and 22e. Collar members 63 are respectively attached to the long side portions 22b and 22c, and collar members 64 are respectively attached to the short side portions 22d and 22e.

Cross-sectional shapes of the collar members 61 to 64 of FIGS. 13 and 14 are the same as those of the collar member 30 of the first embodiment. However, the collar members 61 to 64 of FIGS. 13 and 14 may have a cross-sectional shape as in the modifications of FIGS. 7 to 12.

The collar members 30 and 61 to 64 may be made of a non-conductive resin material. In this case, by interposing the collar members 30 and 61 to 64 between the first member 10 and the second member 20, it is possible to prevent electrolytic corrosion from occurring between the first member 10 made of, for example, aluminum or an aluminum alloy and the second member 20 made of, for example, high tensile steel. That is, it is possible to prevent electrolytic corrosion between the first member 10 and the second member 20 without providing the adhesive layer 40.

Second Embodiment

In the second embodiment described below, the same or similar elements as those in the first embodiment are denoted by the same reference numerals, and detailed description thereof will be omitted. Further, in the second embodiment, the same operations and effects as those in the first embodiment are obtained, except for the points particularly mentioned.

Figure 15:
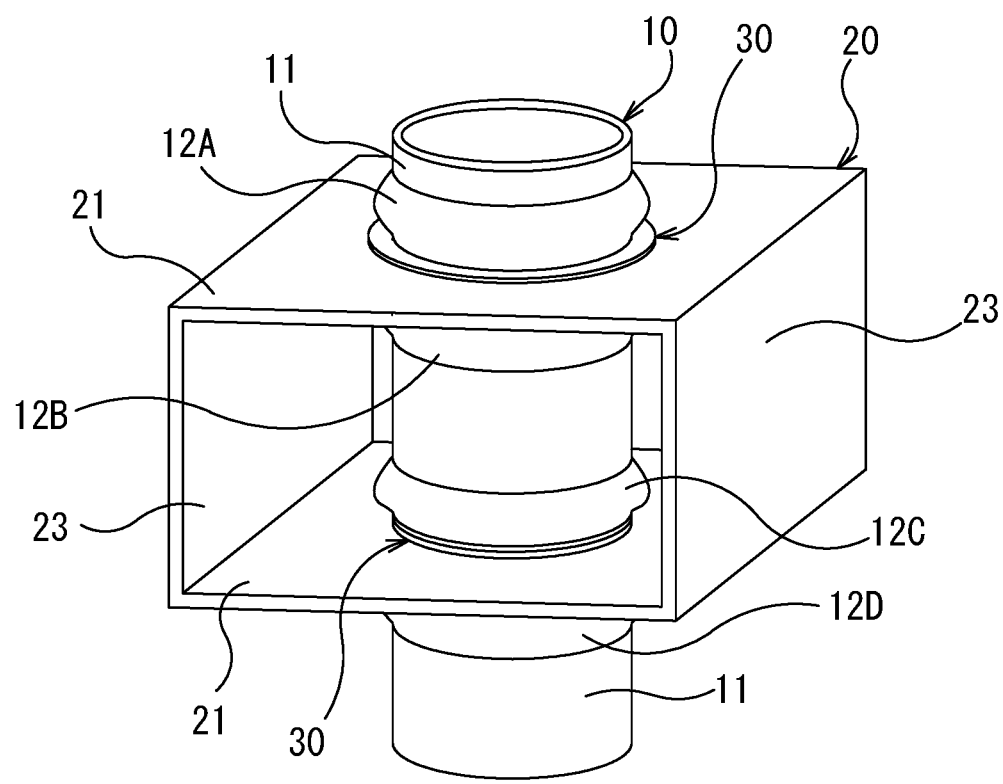
FIG. 15 is a perspective view of a joined body according to a second embodiment of the present invention.
Figure 16:
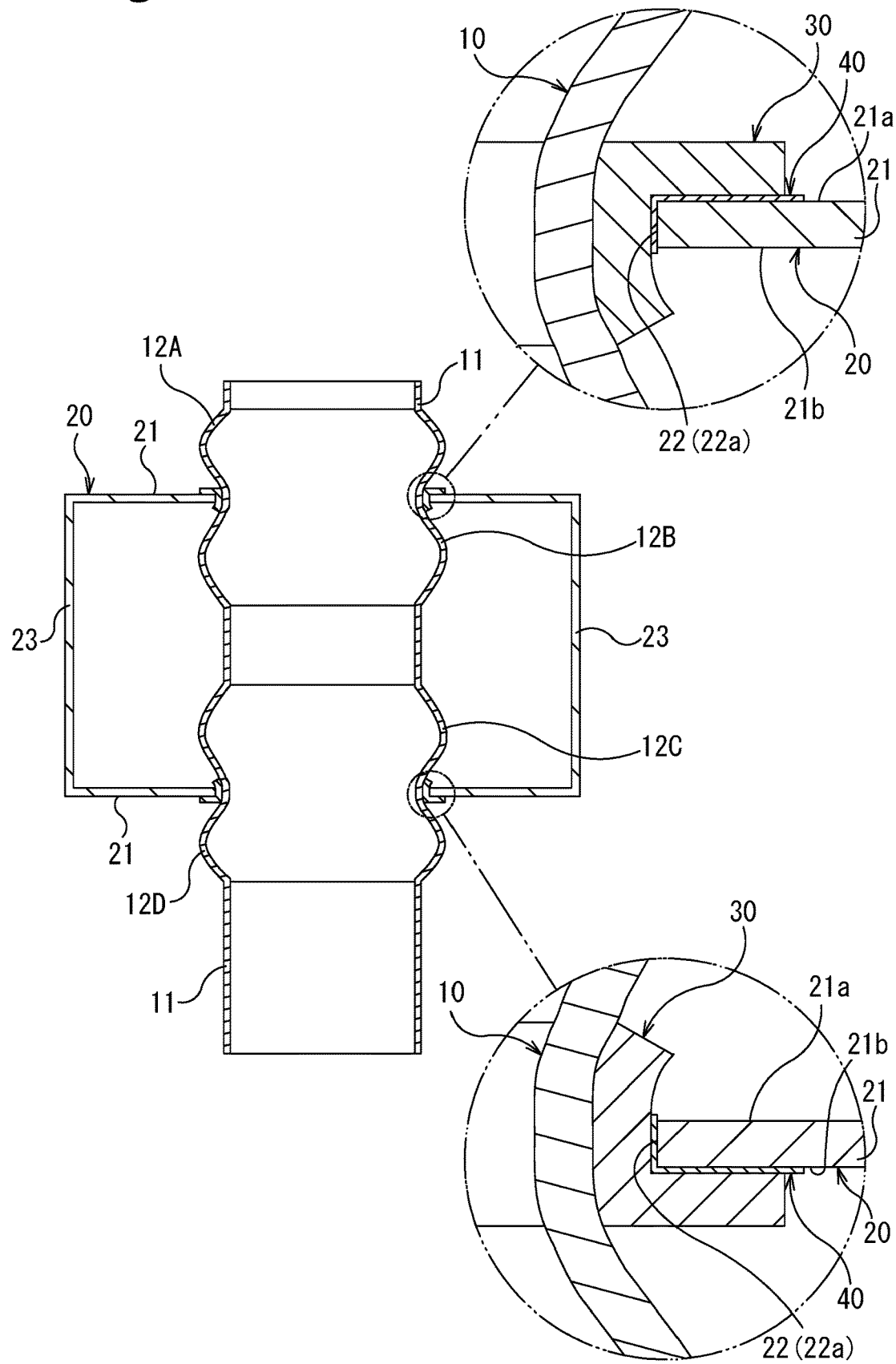
FIG. 16 is a vertical cross-sectional view of the joined body according to the second embodiment.

Referring to FIGS. 15 and 16, the second member 20 of the present embodiment is a hollow member, and the first member 10 and the second member 20 are caulked and joined at two points.

The first member 10 of the present embodiment includes the circular tubular main body 11 and bulging portions 12A, 12B, 12C, and 12D extending in the circumferential direction of the main body 11 and bulging outward in the radial direction.

The second member 20 of the present embodiment includes a pair of wall portions 21 facing each other and side wall portions 23 connecting ends of the wall portions 21. Through-holes 22 are respectively formed in the pair of wall portions 21.

In the present embodiment, the first member 10 is expanded in a state where the first member 10 is inserted into the through-holes 22 of the pair of wall portions 21 of the second member 20, and the collar members 30 are respectively interposed between the first member 10 and the pair of wall portions 21 of the second member 20. By this expansion, the first member 10 and the pair of wall portions 21 of the second member 20 are caulked and joined. One wall portion 21 of the second member 20 is fitted between the bulging portions 12A and 12B of the first member 10 via the collar member 30, and the other wall portion 21 is fitted between the bulging portions 12C and 12D of the first member 10 via the collar member 30, so that the first member 10 is prevented from coming off in the axial direction.

Hereinafter, a method for manufacturing the joined body 1 according to the present embodiment will be described.

Figure 17:
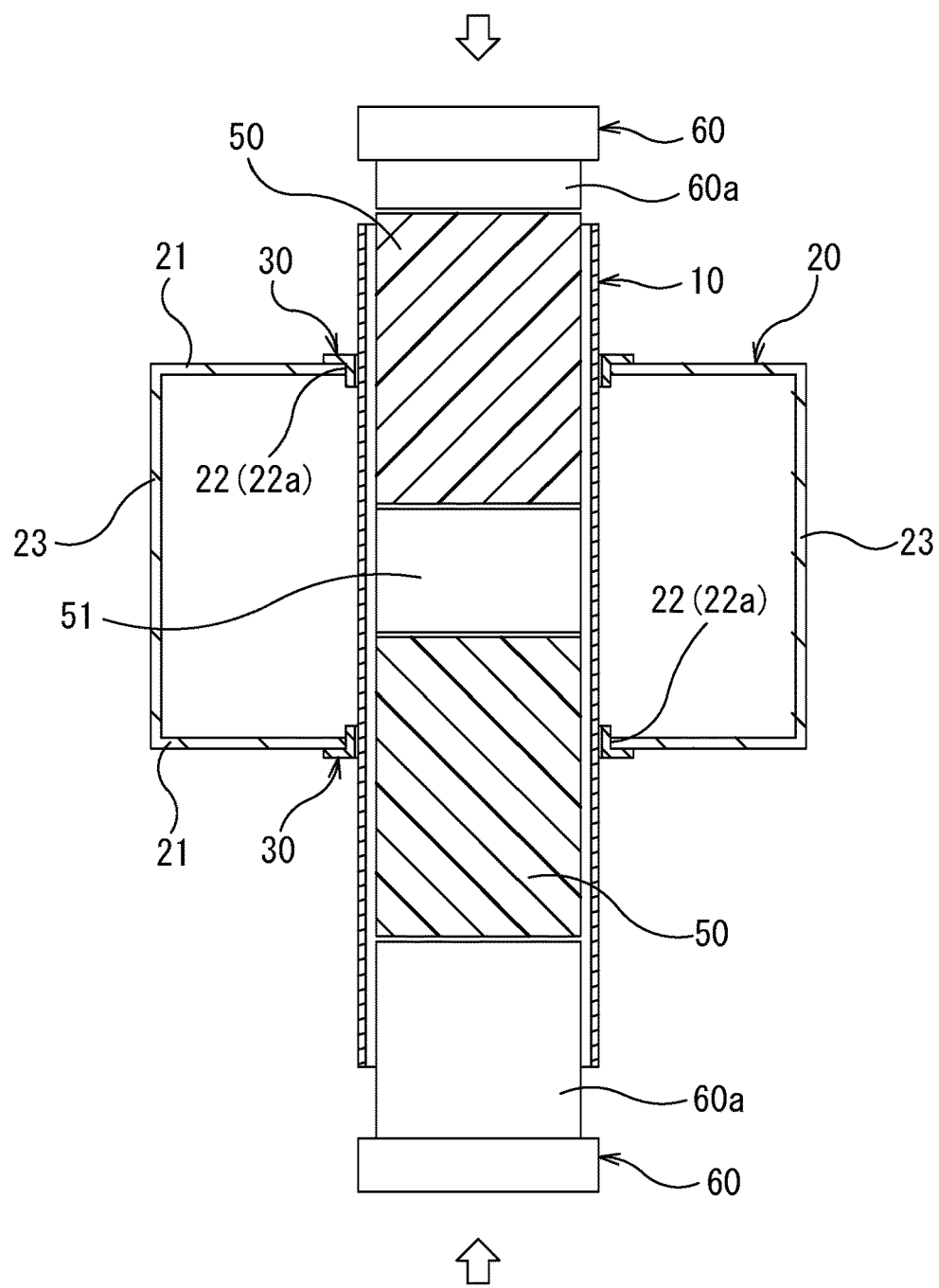
FIG. 17 is a vertical cross-sectional view in the state where the rubber member is inserted in the first member.

First, the collar members 30 are respectively attached to the pair of wall portions 21 of the second member 20 via adhesive layers 40. Subsequently, as illustrated in FIG. 17, the rubber member 50 is inserted into the first member 10. The rubber member 50 may be disposed in the first member 10 before the first member 10 is inserted into the through-hole 22 of the wall portion 21 which is the second member 20. In the present embodiment, the rubber member 50 is divided into two, and a column plate member 51 which is a substantially rigid body is disposed between the rubber members 50.

Subsequently, the pushers 60 are arranged at both ends of the rubber members 50. Subsequently, the rubber member 60 is compressed in the axial direction of the first member 10 by driving the pusher 60 by the press device (not illustrated) (see arrows in FIG. 17). Due to the expansion of the rubber member 50 due to this compression, the first member 10 is expanded, and the first member 10 and the pair of wall portions 21 of the second member 20 are caulked and joined. At this time, the bulging portions 12A and 12B are formed on both sides in the axial direction of the first member 10 with respect to one wall portion 21, and the bulging portions 12C and 12D are also formed on both sides in the axial direction of the first member 10 with respect to the other wall portion 21.

After caulking and joining the first member 10 and the pair of wall portions 21 of the second member 20, the press device (not illustrated) is driven to release the compression of the rubber member 50 by the pusher 60. Thereafter, the rubber member 50 is removed from the first member 10.

Figure 18:
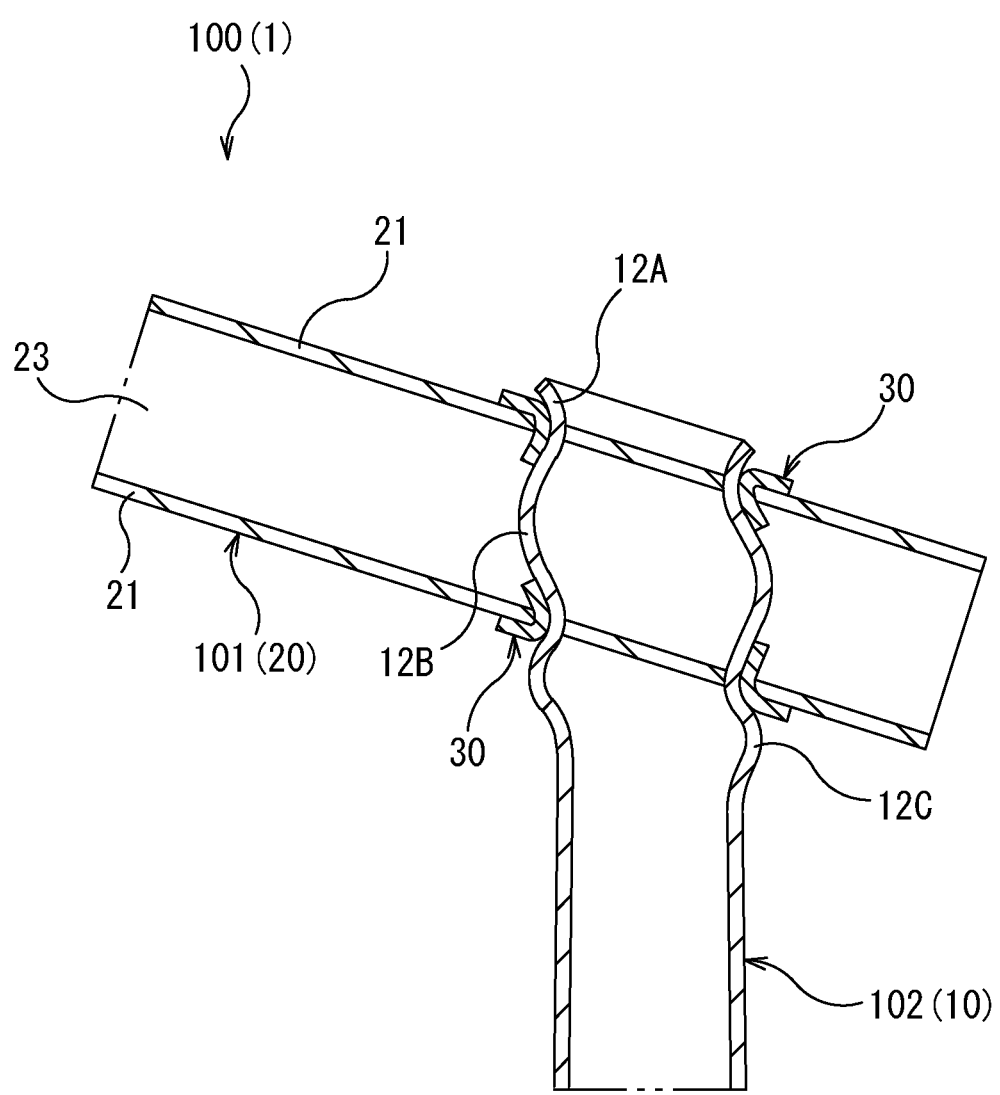
FIG. 18 is a partial cross-sectional view illustrating an example in which the joined body of the second embodiment is applied to a bumper member.

FIG. 18 illustrates an example in which the joined body 1 of the second embodiment is applied to a bumper member 100 of an automobile. In FIG. 18, the same or similar elements as those in the second embodiment are denoted by the same reference numerals. The bumper member 100 includes a bumper reinforce 101 and a pair of stays 102 having tips joined to the bumper reinforce 101 and base ends connected to side members (not illustrated). FIG. 18 illustrates only one stay 102.

The invention claimed is:

1. A joined body comprising:
a tubular first member;
a second member including a plate-shaped wall portion in which a through-hole is formed, the first member being inserted into the through-hole; and
a collar member interposed between the first member and the second member in at least a part of a hole peripheral wall of the through-hole, wherein
the first member and the second member are joined by expanding the first member at a portion corresponding to the through-hole so that a pair of bulging portions is formed in the first member with respect to the through-hole as a boundary, and the second member and the collar member disposed between the pair of bulging portions,
wherein the wall portion includes a first main surface and a second main surface facing each other in a thickness direction of the wall portion, and
the collar member includes:
a first base portion disposed on the first main surface; and
a tubular portion connected to the first base portion, extending in the thickness direction to penetrate the through-hole, including a first end portion located at a distance from the second main surface in the thickness direction, and having an inner peripheral surface in contact with the first member and an outer peripheral surface in contact with the hole peripheral wall of the through-hole,
wherein the collar member in its entirety stays on the external surface of the first member.

2. The joined body according to claim 1, wherein
the collar member further comprises a second base portion connected to the tubular portion and disposed on the second main surface, and
the wall portion is interposed between the first base portion and the second base portion.

3. The joined body according to claim 2, in which the tubular portion further includes a second end portion located at a distance from the first main surface in the thickness direction.

4. The joined body according to claim 1, wherein
the first member is made of a first metal material, and
the second member is made of a second metal material different from the first metal material.

5. The joined body according to claim 4, wherein
the first metal material is aluminum or an aluminum alloy, and
the second metal material is high tensile steel.

6. The joined body according to claim 4, wherein the collar member is made of the first metal material.

7. The joined body according to claim 6, further comprising an adhesive layer interposed between the collar member and the wall portion.

8. The joined body according to claim 4, wherein the collar member is made of a resin material.

9. The joined body according to claim 1, wherein the collar member is annular.

10. The joined body according to claim 1, wherein the collar member is non-annular.

11. A method for producing a joined body, comprising the following steps of:
preparing a tubular first member, a second member including a plate-shaped wall portion in which a through-hole is formed, and a collar member; wherein the wall portion includes a first main surface and a second main surface facing each other in a thickness direction of the wall portion; the collar member includes: a first base portion disposed on the first main surface; and a tubular portion connected to the first base portion, extending in the thickness direction to penetrate the through-hole, including a first end portion located at a distance from the second main surface in the thickness direction, and having an inner peripheral surface in contact with the first member and an outer peripheral surface in contact with the hole peripheral wall of the through-hole; wherein the collar member in its entirety stays on the external surface of the first member;
inserting the first member into the through-hole so that the collar member is interposed between the first member and the second member on a hole peripheral wall of the through-hole; and
expanding the first member toward the second member in a portion corresponding to the through-hole, thereby bonding and joining the first member and the second member so that a pair of bulging portions is formed in the first member with respect to the through-hole as a boundary, and the second member and the collar member disposed between the pair of bulging portions.

* * * * *